US012188855B2

(12) United States Patent
Zhao et al.

(10) Patent No.: US 12,188,855 B2
(45) Date of Patent: Jan. 7, 2025

(54) EXPANSION MICROSCOPY METHODS AND KITS

(71) Applicant: Carnegie Mellon University, Pittsburgh, PA (US)

(72) Inventors: Yongxin Zhao, Sewickley, PA (US); Feifei Fu, Sewickley, PA (US); Aleksandra Klimas, Pittsburgh, PA (US); Aaron Mitchell, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 959 days.

(21) Appl. No.: 17/251,855

(22) PCT Filed: Jun. 14, 2019

(86) PCT No.: PCT/US2019/037239
§ 371 (c)(1),
(2) Date: Dec. 14, 2020

(87) PCT Pub. No.: WO2019/241662
PCT Pub. Date: Dec. 19, 2019

(65) Prior Publication Data
US 2021/0255072 A1    Aug. 19, 2021

Related U.S. Application Data

(60) Provisional application No. 62/763,487, filed on Jun. 15, 2018.

(51) Int. Cl.
*G01N 1/36* (2006.01)
*G01N 1/28* (2006.01)
*G01N 1/30* (2006.01)
*G01N 1/31* (2006.01)

(52) U.S. Cl.
CPC .............. *G01N 1/36* (2013.01); *G01N 1/286* (2013.01); *G01N 1/30* (2013.01); *G01N 1/312* (2013.01); *G01N 2001/302* (2013.01); *G01N 2001/364* (2013.01)

(58) Field of Classification Search
CPC ...... G01N 11/36; G01N 11/286; G01N 11/30; G01N 11/312
See application file for complete search history.

(56) References Cited

U.S. PATENT DOCUMENTS

| 10,309,879 B2 | 6/2019 | Chen et al. |
| 10,317,321 B2 | 6/2019 | Tillberg et al. |
| 10,364,457 B2 | 7/2019 | Wassie et al. |
| 2013/0312141 A1 | 11/2013 | De Block et al. |
| 2016/0305856 A1 | 10/2016 | Boyden et al. |
| 2017/0276578 A1 | 9/2017 | Vaughan et al. |
| 2019/0064037 A1 | 2/2019 | Boyden et al. |
| 2019/0145868 A1 | 5/2019 | Chung et al. |
| 2020/0271556 A1 | 8/2020 | Sarkar et al. |

FOREIGN PATENT DOCUMENTS

| WO | 2015127183 A2 | 8/2015 |
| WO | 2017027367 A1 | 2/2017 |
| WO | 2017027368 A1 | 2/2017 |
| WO | 2017147435 A1 | 8/2017 |
| WO | 2017190101 A1 | 11/2017 |

OTHER PUBLICATIONS

Zhang et al., Hybrid Microscopy: Enabling Inexpensive High-Performance Imaging through Combined Physical and Optical Magnifications. Sci Rep 6, 22691 (2016). https://doi.org/10.1038/srep22691 (Year: 2016).*

Metgud et al. "Conventional xylene and xylene-free methods for routine histopathological preparation of tissue sections", Biotechnic & Histochemistry, 88(5), 235-241. https://doi.org/10.31 (Year: 2013).*

Cipriano et al., "Superabsorbent Hydrogels That are Robust and Highly Stretchable", Macromolecules, 2014, pp. 4445-4452, vol. 47, No. 13.

Fluorophore, Wikipedia, Dec. 24, 2017, pp. 1-4.

Forrer et al., "A novel strategy to design binding molecules harnessing the modular nature of repeat proteins", FEBS Letters, 2003, pp. 2-6, vol. 539.

Gebauer et al., "Engineered protein scaffolds as next-generation antibody therapeutics", Curr. Opin. Chem. Biol., 2009, pp. 245-255, vol. 13.

Huisken et al., "Optional Sectioning Deep Inside Live Embryos by Selective Plane Illumination Microscopy", Science, 2004, pp. 1007-1009, vol. 305.

Ku et al., "Multiplexed and scalable super-resolution imaging of three-dimensional protein localization in size-adjustable tissues", Nature Biotechnology, 2016, pp. 973-981, vol. 34, No. 9.

Nelson, "Antibody Fragments Hope and Hype", MAbs, 2010, pp. 77-83, vol. 2, No. 1.

Zhao et al., "Nanoscale imaging of clinical specimens using pathology-optimized expansion microscopy", Nature Biotechnology, 2017, pp. 757-764, vol. 35, No. 8.

Chang et al., "Iterative expansion microscopy", Nature Methods, 2017, pp. 593-599, vol. 14, No. 6.

Chen et al., "Expansion microscopy", Science, 2015, pp. 543-548, vol. 347, No. 6221.

Chozinkski et al., "Expansion microscopy with conventional antibodies and fluorescent proteins", Nat Methods, 2016, pp. 485-488, vol. 13, No. 6.

Collins et al., "Spectral properties of fluorescence induced by glutaraldehyde fixation", The Journal of Histochemistry and Cytochemistry, 1981, pp. 411-414, vol. 29, No. 3.

(Continued)

*Primary Examiner* — Ruth A Davis
(74) *Attorney, Agent, or Firm* — The Webb Law Firm

(57) ABSTRACT

Provided herein are improved expansion microscopy methods. Also provided herein are kits useful in expansion microscopy.

21 Claims, 8 Drawing Sheets

(56) References Cited

OTHER PUBLICATIONS

Fan et al., "Mechanical expansion microscopy", In Methods in Cell Biology, 2021, pp. 125-146, vol. 161.

Hümpfer et al., "Expanding boundaries—a cell biologist's guide to expansion microscopy", Journal of Cell Science, 2024, pp. 1-12, vol. 137.

Khan et al., "Synthesis and Characterization of Acrylamide/Acrylic Acid Co-Polymers and Glutaraldehyde Crosslinked pH-Sensitive Hydrogels", Gels, 2022, pp. 1-18, vol. 8, No. 47.

Klimas et al., "Magnify is a universal molecular anchoring strategy for expansion microscopy", Nat Biotechnol, 2023, pp. 858-869, vol. 41.

Wassie et al., "Expansion microscopy: principles and uses in biological research", Nature Methods, 2018, pp. 33-41, vol. 16, No. 1.

* cited by examiner

EXPANSION MICROSCOPY METHODS AND KITS

CROSS REFERENCE TO RELATED APPLICATIONS

This application is the United States national phase of International Application No. PCT/US2019/037239 filed Jun. 14, 2019, and claims the benefit of United States Provisional Patent Application No. 62/763,487, filed Jun. 15, 2018, the disclosures of which are hereby incorporated by reference in their entirety.

STATEMENT REGARDING FEDERAL FUNDING

This invention was made with government support under Grant No. 1DP2EB028111 awarded by the National Institutes of Health. The government has certain rights in the invention.

FIELD OF INVENTION

The present invention relates to optical imaging, such as by expansion microscopy, labelling, and analysis, of cells, whole organisms, and tissues.

BACKGROUND

Small structures (e.g., biomolecules, proteins, DNA and/or RNA) within fixed cells and tissues are often too small for successful optical microscopic imaging. Expansion microscopy enables super-resolution optical interrogations and overcomes the optical diffraction limit of conventional optical microscopy. It was developed to allow for the imaging of thick, preserved specimens with approximately 70 nm lateral resolution. With expansion microscopy, a biological specimen is expanded prior to imaging, bringing previously sub-diffraction limited structures to a size within the range of a conventional microscope with nanoscale precision. Examples of expansion microscopy are described in, without limitation International Patent Application Publication Nos. WO 2015/127183, WO 2017/027368, WO 2017/027367, and WO 2017/147435, and in Zhao et al, *Nature Biotechnology*, 35, 757-764, each of which is incorporated herein by reference for its technical teachings regarding expansion microscopy.

With expansion microscopy, fluorophore-labeled biomolecules, are locked into a swellable hydrogel that is synthesized within the sample. The gel integrates with both the biological specimen and the fluorophore-labeled biomolecules. In current systems, gel-anchorable fluorophores may be specific to one or more biomolecules, proteins, DNAs, and/or RNAs of interest, and comprise a chemical group that can interact with the polymerized gel matrix. These fluorophores therefore are often custom-made for use as an appropriate anchoring agent for the desired biomolecule, protein, DNA, and/or RNA. Three-dimensional multiplex images can also be collected through the simultaneous use of several, different fluorophore labels. Following biomolecule labeling, the gelled-biological specimens are treated with protease to digest tissue material and to homogenize the mechanical properties of the gel. The protease-only homogenization buffers utilized with traditional expansion microscopy are capable of digesting tissue material and proteins but are unable to break down cell walls of bacterial and fungal cells. The swellable gels are then hydrated to facilitate uniform, e.g. isotropic, expansion of the gel-specimen matrix and fluorescent labels.

While expansion microscopy to date has shown promise, improvements in speed, efficiency, ability to image thick tissue samples, ability to image fungal or bacterial samples, and flexibility of treatments are desirable.

SUMMARY

According to one aspect or embodiment of the invention, provided herein is a method of preparing a cell or tissue sample for microscopy, comprising: permeating the sample with a polymer monomer composition comprising an $\alpha,\beta$-unsaturated carbonyl monomer, such as an acrylate, methacrylate, acrylamide, or methacrylamide monomer for producing a water-swellable (co)polymer, and an enal, such as acrolein or methacrolein, able to polymerize with the acrylate, methacrylate, acrylamide, or methacrylamide monomer; and polymerizing the polymer monomer composition with the enal to form a swellable material containing the cell or tissue sample, resulting in covalent linking of the enal to both the swellable material and a biomaterial in the sample.

According to another aspect, or embodiment, a method of producing a high-resolution microscopic image of a cell or tissue sample is provided, comprising preparing a cell or tissue sample by permeating and hydrating the cell or tissue sample as described in the previous paragraph, and viewing and/or imaging the cell or tissue sample.

In yet another aspect or embodiment, a kit is provided, comprising a vessel containing a $\alpha,\beta$-unsaturated carbonyl monomer; an enal in the same vessel as the $\alpha,\beta$-unsaturated carbonyl monomer, or in a separate vessel; and a mold of chamber for receiving a biological specimen and polymerizing the $\alpha,\beta$-unsaturated carbonyl monomer and the enal.

BRIEF DESCRIPTION OF THE DRAWINGS

(FIG. 8A) Immunofluorescence images (originals in color) of mitochondrial protein VDAC in the tissue; (FIG. 8B) The fluorescent intensity of labeled mitochondria was plotted as a function of imaging cycle number. (FIG. 8C) DAPI images in the same fields of view as A. (FIG. 8D) DAPI signal intensity was plotted as a function of imaging cycle number. Expansion factor: 3.8. Scale bar, 10 μm (biological scale).

DETAILED DESCRIPTION

Figure 1:
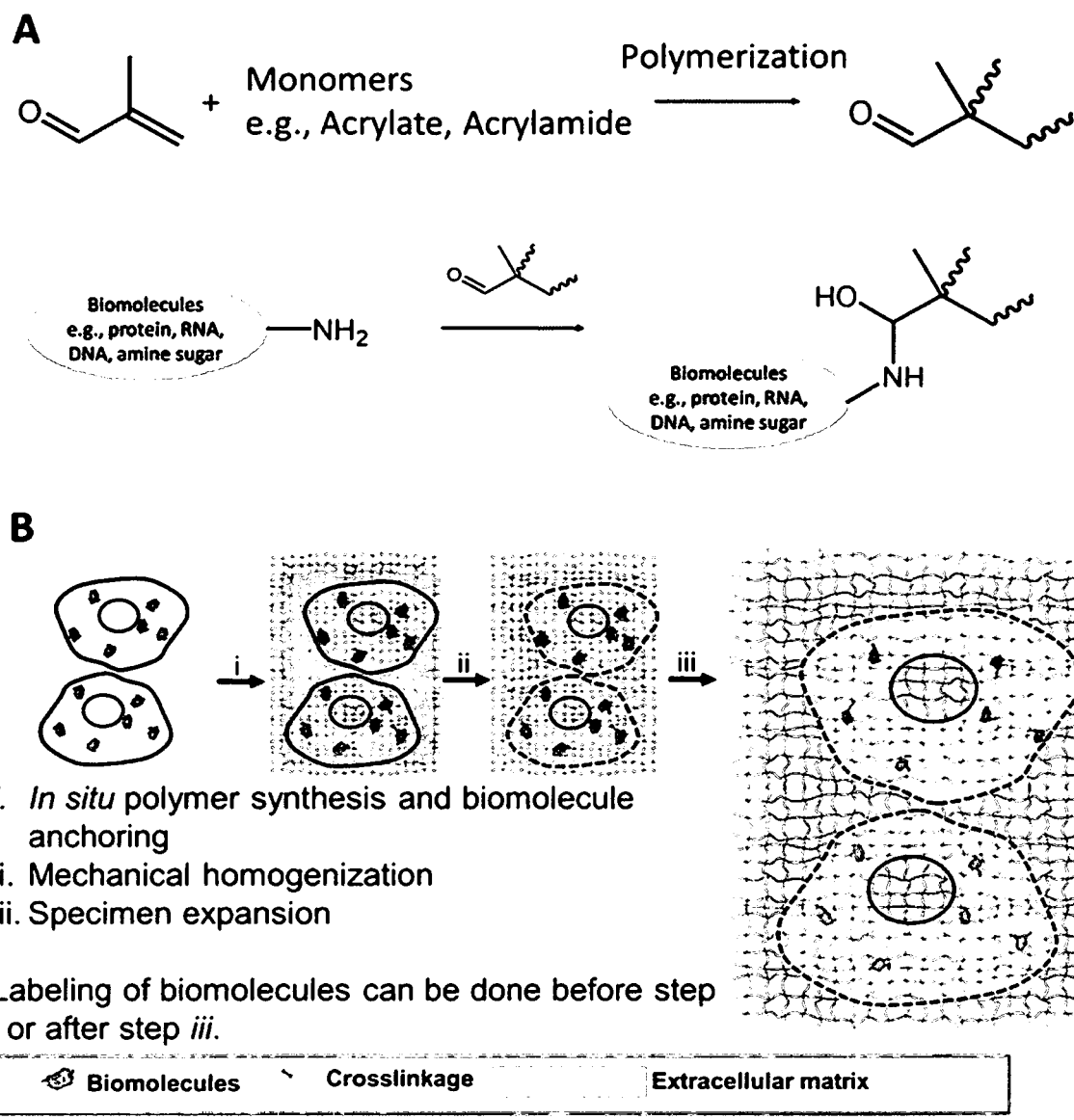
FIG. 1 shows (A) a schematic diagram of the chemistry that covalently incorporates biomolecules into polymer chains during in situ polymerization, and (B) a schematic diagram of biomolecule retention expansion microscopy.

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of ranges is intended as a continuous range including every value between the minimum and maximum values. As used herein "a" and "an" refer to one or more. A patient is a human or non-human animal.

As used herein, the term "comprising" is open-ended and may be synonymous with "including", "containing", or "characterized by". As used herein, embodiments "comprising" one or more stated elements or steps also include, but are not limited to embodiments "consisting essentially of" and "consisting of" these stated elements or steps.

A "moiety" (pl. "moieties") is a part of a chemical compound, and includes groups, such as functional groups. As such, a nucleobase moiety is a nucleobase that is modified by attachment to another compound moiety, such as a polymer monomer, e.g. the nucleic acid or nucleic acid analog monomers described herein, or a polymer, such as a nucleic acid or nucleic acid analog as described herein.

"Alkyl" refers to straight, branched chain, or cyclic hydrocarbon groups including from 1 to about 20 carbon atoms, for example and without limitation $C_{1-3}$, $C_{1-6}$, $C_{1-10}$ groups, for example and without limitation, straight, branched chain alkyl groups such as methyl, ethyl, propyl, butyl, pentyl, hexyl, heptyl, octyl, nonyl, decyl, undecyl, dodecyl, and the like. "Substituted alkyl" refers to alkyl substituted at 1 or more, e.g., 1, 2, 3, 4, 5, or even 6 positions, which substituents are attached at any available atom to produce a stable compound, with substitution as described herein. "Optionally substituted alkyl" refers to alkyl or substituted alkyl. "Halogen," "halide," and "halo" refers to —F, —Cl, —Br, and/or —I. "Alkylene" and "substituted alkylene" refer to divalent alkyl and divalent substituted alkyl, respectively, including, without limitation, ethylene (—$CH_2$—$CH_2$—). "Optionally substituted alkylene" refers to alkylene or substituted alkylene.

As used herein, the term "polymer composition" is a composition comprising one or more polymers. As a class, "polymers" includes, without limitation, homopolymers, heteropolymers, co-polymers, block polymers, block co-polymers and can be both natural and/or synthetic. Homopolymers contain one type of building block, or monomer, whereas copolymers contain more than one type of monomer. The term "(co)polymer" and like terms refer to either homopolymers or copolymers. A polymer may have any shape for the chain making up the backbone of the polymer, including, without limitation: linear, branched, networked, star, brush, comb, or dendritic shapes.

A polymer "comprises" or is "derived from" a stated monomer if that monomer is incorporated into the polymer. Thus, the incorporated monomer (monomer residue) that the polymer comprises is not the same as the monomer prior to incorporation into a polymer, in that at the very least, certain groups/moieties are missing and/or modified when incorporated into the polymer backbone. A polymer is said to comprise a specific type of linkage if that linkage is present in the polymer, such as, without limitation: ester, amide, carbonyl, ether, thioester, thioether, disulfide, sulfonyl, amine, carbonyl, or carbamate bonds.

The term "ligand" refers to a binding moiety for a specific target, its binding partner. The molecule can be a cognate receptor, a protein, a small molecule, a hapten, or any other relevant molecule, such as an affibody or a paratope-containing molecule. The term "antibody" refers to an immunoglobulin, derivatives thereof which maintain specific binding ability, and proteins having a binding domain which is homologous or largely homologous to an immunoglobulin binding domain. As such, the antibody operates as a ligand for its cognate antigen, which can be virtually any molecule. Antibody mimetics are not antibodies, but comprise binding moieties or structures, e.g. paratopes, and include, for example, and without limitation: an affibody, an aptamer, an affilin, an affimer, an affitin, an alphabody, an aticalin, an avimer, a DARPin, a funomer, a Kunitz domain peptide, a monobody, a nanoclamp, or other engineered protein ligands, e.g. comprising a paratope targeting any suitable epitope present in a sample.

The term "antibody fragment" refers to any derivative of an antibody which is less than full-length. In exemplary embodiments, the antibody fragment retains at least a significant portion of the full-length antibody's specific binding ability. Examples of antibody fragments include, but are not limited to, Fab, Fab', F(ab')$_2$, Fv, Fd, dsFv, scFv, diabody, triabody, tetrabody, di-scFv (dimeric single-chain variable fragment), bi-specific T-cell engager (BiTE), single-domain antibody (sdAb), or antibody binding domain fragments. In the context of targeting ligands, the antibody fragment may be a single chain antibody fragment. Alternatively, the fragment may comprise multiple chains which are linked together, for instance, by disulfide linkages. The fragment may also optionally be a multimolecular complex. A functional antibody fragment will typically comprise at least about 50 amino acids and more typically will comprise at least about 200 amino acids.

Ligands also include other engineered binding reagents, such as affibodies and designed ankyrin repeat proteins (DARPins), that exploit the modular nature of repeat proteins (Forrer T, Stumpp M T, Binz H K, Plückthun A: A novel strategy to design binding molecules harnessing the modular nature of repeat proteins, FEBS Lett 2003, 539: 2-6; Gebauer A, Skerra A: Engineered protein scaffolds as next-generation antibody therapeutics, Curr Opin Chem Biol 2009, 13:245-255), comprising, often as a single chain, one or more antigen-binding or epitope-binding sequences and at a minimum any other amino acid sequences needed to ensure appropriate specificity, delivery, and stability of the composition (see also, e.g., Nelson, A L, "Antibody Fragments Hope and Hype" (2010) MAbs 2(1):77-83).

Nucleic acid analogs hybridize to nucleic acids, and may have standard nucleobases (e.g., adenine, cytosine, thymine, uracil, and guanine), or other nucleobases as RNA or DNA as found in living organisms, but have different polymeric backbones as compared to include, for example and without limitation: phosphorothioate DNA, peptide nucleic acid, a, 6-constrained nucleic acid, 2'-methoxyl RNA, 2'-fluoro RNA, phosphorodiamidate morpholino oligomer, locked nucleic acid, 2',4'-constrained ethyl nucleic acid, 2',4' bridged nucleic acid NC (N—H), 2',4' bridged nucleic acid NC (N-methyl), ((S)-5'-C-methyl DNA (RNA)), and 5'-E-vinylphosphonate nucleic acid. In the context of the present invention, ligands are useful in immunohistochemical, or immunofluorescent labeling of biomolecules in the sample.

A large variety of dyes, such as DAPI (which directly binds dsDNA), that label biomolecules directly, fluorescent tags, such as fluorescent dyes (e.g., fluorescein, cyanine, rhodamine, fluorescent proteins, among many other commercially-available dyes), or enzymes (e.g., horseradish peroxidase, alkaline phosphatase, glucose oxygenase, or β-galactosidase) may be conjugated with ligands, such as antibodies and antibody fragments or nucleic acids or nucleic acid analogs, for use in labeling biomolecules in a sample by any direct or indirect binding method. Antibodies and other ligands conjugated to dyes or enzymes, e.g. fluorophores, are broadly-available commercially.

Provided herein according to one embodiment or aspect of the invention is a method of preparing a cell or tissue sample for microscopy. The cell or tissue sample, which can be referred to as a specimen, may be a cell, or a cell pellet, a bodily fluid, such as blood or urine or a centrifuged pellet therein, a section prepared, e.g. by use of a microtome, a biopsy, an organ, a plurality of organs or a portion of a whole organism, or a whole organism, including an embryo or larva. A section may be prepared from fixed and/or frozen tissue, e.g. by use of a microtome or cryostat. The sample may be fixed using a fixative, such as formaldehyde and embedded in paraffin, OCT or another suitable composition.

In embodiments, referring to FIG. 1A, aldehyde-reactive biomolecules of interest (proteins, RNA, DNA, amine sugars) are covalently bonded to the polymeric hydrogel, using acrolein, methacrolein, or a similar derivative within a polyelectrolyte formulation. Synthesis of the polymer hydrogel and biomolecule anchoring occur in situ with the biological sample. Polymerization is followed by homogenization of sample's mechanic properties. By "homogenization", it is meant homogenization of the sample's mechanical properties to facilitate clean and even expansion (e.g. isotropic expansion) of the sample during swelling of the sample. Homogenization can be achieved as a result of, for example and without limitation, protease digestion and/or heat denaturation with surfactants. After homogenization, the specimen/polymer is expanded. FIG. 1B outlines this exemplary scheme. The anchored biomolecules can be labelled before hydrogel synthesis or after specimen/polymer matrix expansion. The expanded polymer matrix with labelled biomolecules may be analyzed using a conventional fluorescent, confocal microscope or other desired microscope.

One feature of the crosslinking of the hydrogel to the biomolecules using the enal, e.g. acrolein or methacrolein, as described herein, is that the crosslinking bond is labile, in that the bond will hydrolyze over time, leaving the original antigens embedded in the hydrogel in an expanded state. As such, after the sample is expanded, in situ assays, such as, without limitation, immunofluorescence, immunohistochemistry, and in situ hybridization, can be performed.

An additional benefit of the expansion methods described herein is the rapid and complete infusion of the polymer monomers into tissue samples, including very thick tissue samples, such as organs, organ systems, or even complete organisms, permitting three-dimensional (3D) visualization and imaging of highly complex tissue structures, e.g., using layered scanning by laser confocal imaging methods.

The cell or tissue sample can be processed directly, optionally after fixation, e.g., with acetone, but if it is mounted in paraffin, OCT, or other embedding materials, those materials may be removed using appropriate solvent(s), ultimately to provide the cell or tissue sample in an aqueous solution, such as PBS, that is permissive to polymerization of acrylic or acrylamide polymers. For example, and without limitation, for a formaldehyde-fixed sample embedded in paraffin, deparaffinizing the sample, e.g., by sequential washes with an organic solvent, such as xylene, followed by one or more washes with ethanol and water. In one non-limiting example, for deparaffinizing a sample, washes of xylene (2×), 100% ethanol (2×), 95% ethanol, 70% ethanol, 50% ethanol, and water are performed, in order. Permanently-mounted slides can be preprocessed in the same manner, or in a similar manner. OCT fixative may be solubilized in PBS, and unfixed, frozen samples may be fixed in acetone. Prior to permeabilization with polymer monomers, the sample may be further processed, e.g. by heat treatment, for example at 60° C. for 30 minutes. The sample also may be treated with a surfactant.

The cell or tissue sample is then permeated with (infused with) a swellable material. In one embodiment, the cell or tissue sample is permeated with (infused with) the polymer monomer composition. This is accomplished by immersing the sample in a solution containing suitable polymer monomers. For expansion microscopy, the monomers result in a water-swellable polymer composition. Water-swellable hydrophilic polymers can absorb several times their weight of water or aqueous liquids, such as urine or blood, and are therefore commonly employed as absorbents, in particular in hygiene articles such as diapers for babies and incontinence pants for adults, and also tampons and the like. Useful water-swellable monomers for producing a water-swellable (co)polymer include any monomer that, when polymerized as a (co)polymer, produces a water-swellable polymer. Water-swellable (co)polymers are often made by initially polymerizing α,β-unsaturated carbonyl monomers, such as unsaturated carboxylic acids, or derivatives thereof, such as, for example, acrylates, such as acrylic acid, alkali metal (e.g., sodium and/or potassium) or ammonium salts of acrylic acid or other acrylates, alkyl acrylates such as methacrylate, and the like, and/or acrylamides, such acrylamide, alkylacrylamides, methacrylamide, and/or N,N-dimethylacrylamide. The monomers are polymerized in the presence of relatively small amounts of di- or poly-functional monomers (crosslinkers, or multi-functional monomers), such as N,N'-methylenebisacrylamide, N,N'-bisacryloyl-1,2-dihydroxy-1,2-ethylenediamine, N,N'-ethylenebis(acrylamide), trimethylolpropane triacrylate, ethylene glycol di(meth)acrylate, or triallylamine. When N,N-dimethylacrylamide is used in high concentrations, such as if it is used as a monomer for the primary polymer, it also may act as a crosslinker (see, e.g., Cipriano, B H, et al. Superabsorbent Hydrogels That Are Robust and Highly Stretchable. *Macromolecules* 2014 47(13):4445-4452). The di- or poly-functional monomer materials serve to lightly crosslink the polymer chains thereby rendering them water-insoluble, yet water-swellable. These lightly-crosslinked absorbent polymers contain a multiplicity of carboxylate groups attached to the polymer backbone.

In a typical polymerization mixture, the concentration of α,β-unsaturated carbonyl monomers, may be from 1 g/100 mL to the saturated concentration, such as from 1 g/100 mL to 35 g/100 mL. The total molar concentration of α,β-unsaturated carbonyl monomers, may be from 0.5 M to 6 M. The concentration of crosslinkers, such as N,N'-methylene bis(acrylamide), may be from 0.01 g/100 mL to 5 g/100 mL. The concentration of enal, such as acrolein or methacrolein, may be from 0.01 g/100 mL to 10 g/100 mL. When combined in a typical polymerization mixture, the concentration of acrylate monomer may be from 5 g/100 mL to 35 g/100 mL, the concentration of acrylamide monomer may be from 0 g/100 mL to 5 g/100 mL, the concentration of N,N-dimethylacrylamide may be from 0 g/100 mL to 35 g/100 mL. The total molar concentration of α,β-unsaturated carbonyl monomers, may be from 1 M to 5 M. The concentration of crosslinkers, such as N,N'-methylene bis(acrylamide), may be from 0.1 g/100 mL to 0.2 g/100 mL. The concentration of enal, such as acrolein or methacrolein, may be from 0.05 g/100 mL to 5 g/100 mL.

α,β-unsaturated carbonyl monomers include, for example and without limitation: acrylic acids and alkali metal salts thereof, e.g., acrylic acid, methacrylic acid, α-chloroacrylic acid, α-cyanoacrylic acid, acrylamide, methacrylamide, N,N-dimethylacrylamide, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citroconic acid, mesaconic acid, glutaconic acid, aconitic acid, maleic acid, fumaric acid, tricarboxyethylene, and maleic anhydride. Combinations of any of the above, forming a copolymer, also are useful, such as a combination of an alkali metal salt of an acrylate in combination with acrylamide, methacrylamide, or N,N-dimethylacrylamide.

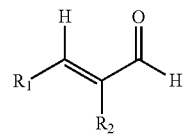

In combination with the above-described monomers, an enal (e.g., where $R_1$ and $R_2$ are, independently: H, $C_1$-$C_3$ alkyl, $C_1$-$C_3$ haloalkyl, $C_1$-$C_3$ alkyl-aryl, or $C_1$-$C_3$ halo alkyl-aryl) is added to the monomer mixture prior to polymerization along with any necessary catalysts or cofactors necessary for the polymerization to proceed. Non-limiting examples of suitable enals include acrolein and methacrolein. The enals may be infused with the monomers of the water-swellable polymer, or afterwards.

After the sample is infused with suitable monomers for preparation of a water-swellable polymer, the monomers are polymerized in situ. As such during infusion of the monomers, or afterward, reagents necessary or useful to cause or accelerate polymerization are added, such as a catalyst, or any other reagent(s) necessary or useful for polymerizing the monomers. As indicated above, the enal, such as acrolein or methacrolein, may be added at this time. Infusion and polymerization may take place in a suitable container or mold, such as the gel chamber shown in FIG. 2.

After polymerization, biomolecules and any added ligands, tags, or probes are locked or anchored into place both by the formation of the polymer backbones about the biomolecules, and the covalent linkage of the biomolecules, ligands, tags, or probes to the polymer backbone via the enal, such as acrolein or methacrolein. At this point, to avoid damage to the specimen during expansion, and to facilitate expansion, the internal mechanic properties of sample is homogenized using a protease or a combination of denaturants and/or heat.

Bacteria, fungi, and plants have cell walls that prohibit traditional expansion microscopy, even with use of a protease digest. As such, alternatively, or in combination with homogenization with the protease, where the sample comprises an organism having a cell wall, the cell wall is enzymatically digested before or after infusion and polymerization and before expansion of the swellable hydrogel in the sample. Examples of enzymes useful in digestion of cell walls, include a glucanase or a cellulase, such as lyticase (e.g., from *Arthrobacter luteus*), Achromopeptidase, lysing Enzymes from *Trichoderma harzianum*, pectinase, pectolyase, lysostaphin, lysozyme, mutanolysin, and/or chitinase.

Once the polymer (hydrogel) is formed, and, if necessary, the sample is homogenized, for example by protease digestion, the sample can be expanded by hydration. Hydration involves contacting the hydrogel containing the sample with water, or a suitably low ionic strength aqueous solution to cause swelling of the polymer. The sample is thereby expanded isotropically. Typically, the expansion factor upon hydration is at least 2, and more typically greater than 3, meaning the isotropic expansion in any linear dimension is at least 2 and is more typically greater than 3, depending on the choice of monomers, crosslinking density, among other factors.

At any suitable point in the processing of a cell or tissue sample, biomolecules may be dyed or labeled in any suitable and effective manner. In one example the sample is labeled prior to infusion or polymerization with the monomers, as described herein. In another example, the sample is labeled after polymerization, but before expansion of the sample, and optionally before protease digestion of the sample. In one example the sample is labeled after expansion. In yet another example, a biomolecule in the sample is labeled with a first label after expansion, viewed or imaged, and subsequently the first label is removed, and a second label is used to label a different biomolecule. This process may be repeated multiple times. At any stage, multiple labels may be used simultaneously, e.g., fluorescent labels with different emission spectra, to label different biomolecules in the sample. Of note, in contrast to the use of traditional expansion microscopy reagents, bonds between the enal residues and the biomolecules in the expanded cell or tissue sample can reverse over time, exposing additional epitopes or binding sites, thereby expanding the ability to visualize biomolecules in the sample.

Also provided herein is a kit for use in expansion microscopy. A kit comprises various components that are packaged for storage, transport, and distribution in any suitable container. A kit for use in expansion microscopy methods comprises one or more vessels. In a vessel, in one embodiment, is a mixture of monomers for producing a water-swellable polymer, and in the same vessel, or in another vessel is an enal, such as acrolein or methacrolein. The monomers are $\alpha,\beta$-unsaturated carbonyl monomers, such as acrylate monomers and/or acrylamide and/or N,N-dimethylacrylamide monomers, such as sodium acrylate with acrylamide, optionally with a crosslinker, such as N,N'-methylene bis(acrylamide). Optionally the kit comprises a mold or chamber for use in formation of the hydrogel comprising the sample. A suitable catalyst or any other reagents for promoting polymer formation also can be included in the kit, typically in a separate vessel from the monomers.

Example 1: Procedure Using Biomolecule Retention Polymer

Various tissue samples are pre-processed according to the following:

A formaldehyde-fixed paraffin-embedded (FFPE) clinical sample can be immersed in xylene two times, two times 100% ethanol, one time in 95% ethanol, one time in 70% ethanol, one time in 50% ethanol and one time in doubly deionized (ddH$_2$O) water, respectively. The clinical sample is exposed to room temperature (RT) solutions for 3 minutes at each step.

A stained and mounted permanent slide can be briefly placed in room temperature xylene to remove the slide cover slip. If the cover slip is not removed in the first rinse, the slide can be further incubated in xylene. The slide is washed two times in 100% ethanol, one time in 95% ethanol, one time in 70% ethanol, one time in 50% ethanol, and one time in ddH$_2$O, respectively. The slide is exposed to RT solutions for 3 minutes at each step.

Unfixed, frozen tissue slides in optimum cutting temperature (OCT) solution (Tissue-Tek, Sakura Americas) can be fixed in −20° C. acetone for 10 minutes before washing with RT 1× phosphate buffer saline (PBS) solution 3 times for 10 minutes each.

Slides of fixed, frozen clinical tissue sections can be exposed to RT conditions for 2 minutes and then washed with RT PBS solution 3 times for 5 minutes each.

Prepared specimen slides can be placed a heat-resistant container full of 100° C. 20 mM sodium citrate solution (pH 8) and placed in an incubation chamber for 30 minutes at 60° C. The samples are treated with MAXblock™ Blocking Medium (Active Motif) for 1 hour at 37° C. or 2 hours at RT or 4° C. overnight. The tissue samples with primary antibodies are incubated with MAXbind™ Staining Medium (Active Motif) for 3 hours at RT or 37° C. or overnight at 4° C. in a humidified container, depending on the antibodies being used. The tissue is washed with RT MAXwash™ Washing Medium (Active Motif) 3 times at 10 minutes each. The tissue slides are incubated with secondary antibodies at a concentration of approximately 10 μg/mL and 300 nM 4',6-diamidino-2-phenylindole (DAPI, Thermo Fisher Scientific) in MAXbind™ Staining Buffer for 1 hour at RT or 37° C., antibody dependent. The tissue slides are washed 3 times with RT MAXwash™ Washing Buffer at 10 minutes each.

A monomer 1 solution was prepared by mixing together 38 g/100 mL sodium acrylate (final concentration 8.6 g/100 mL), 50 g/100 mL acrylamide (final concentration 2.5 g/100 mL), 2 g/100 mL N,N'-methylenebisacrylamide (final concentration 0.10 g/100 mL), 29.2 g/100 mL sodium chloride (final concentration 11.7 g/100 mL), 10×PBS (final concentration 1×), and 1.15 mL of water at 4° C. The monomer solution was prepared and stored at −20° C. The version 1 gelling solution was prepared on ice and was composed of 188 μL of the previously prepared monomer solution (at 4° C.), 4 μL of aqueous 10% tetramethylethylenediamine (TEMED) accelerator solution, 4 μL of aqueous 0.5% 4-hydroxy-2,2,6,6-tetramethylpiperidin-1-oxyl (4HT) inhibitor solution, 4 uL of aqueous 10% ammonium persulfate (APS) initiator solution, and 0.8 μL of aqueous 95% methacrolein (final concentration 0.5%) solution. The APS initiator solution was added last to prevent premature gelation. The cold, immediately prepared gelling solution (200 μL for each tissue section on slide), was added to the top of the tissue section and it was ensured that the sample was entirely covered. The tissue sample with the gelling solution was incubated for 30 minutes at 4° C.

Figure 2:
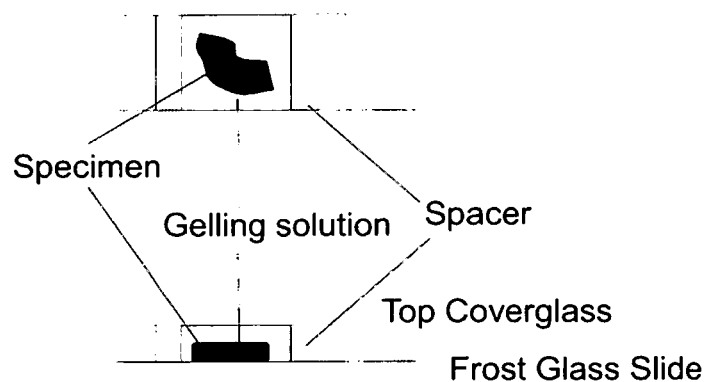
FIG. 2 shows schematically, a gel chamber for use in preparing expanded samples as described herein.

The gel chamber was constructed by sandwiching the tissue slice between a slide and a coverslip (VWR micro cover glass, 24×60 mm, No. 1 or No. 1.5) (FIG. 2). Diamond knife cut coverslips were used as spacers to prevent compression of the tissue slice. The gel chamber was assembled and incubated at 37° C. in a humidified environment for 2 hours. After incubation, the gel was digested and expanded, or stored at 4° C. inside a sealed, closed container.

Prior to digestion and expansion, the coverslip of the gel chamber was gently lifted off the tissue surface using a razor blade. The tissue containing gel was trimmed to minimize volume and a corner was removed at an off-angle to ensure proper orientation throughout the preparation process. The gel, still mounted on the slide, was submerged in 3 mL of freshly prepared digestion buffer for 3 hours at 60° C. in a sealed container. The digestion buffer was prepared by mixing together 50 mM Tris (pH 8), 25 mM EDTA, 0.5% Triton X-100, 0.8 M NaCl, and 4 units/mL of Proteinase K (Molecular Biology Grade, NE Biolabs) from a 1:200 stock solution. The digestion step facilitates the gel de-attachment from the slide surface, but a razor blade can be used to shave the sample off the slide, if not detached. The tissue-gel sample, tissue side down, was placed in a 6-well plate filled with PBS. The tissue sample was washed 1 time with PBS buffer for 10 minutes and then stained with 300 nM DAPI in PBS for 20 minutes, followed by 1 PBS rinse for 10 minutes. All staining and washing steps following expansion and digestion were carried out at RT unless otherwise noted.

To expand the tissue samples, PBS was removed from the 6-well plate and the sample was washed with excess ddH$_2$O (at 10 times the final gel volume) 3 to 5 times for 10 minutes each time. To prevent bacterial growth, 0.002-0.01% sodium azide can be added to the ddH$_2$O, but the expansion factor is reduced by 10%. The tissue slice reached an expansion plateau after about the third or fourth wash cycle. Following expansion, the gel was immobilized with 1.5-2% aqueous low melt agarose to prevent drifting during imaging. The immobilized gels were imaged with a conventional fluorescent, confocal microscope, or other desired microscope.

Example 2: Multiplex Expansion Microscopy for Human Brain Tissue Using Biomolecule Retention Polymer An FFPE clinical sample, a stained and mounted permanent slide, an unfixed, frozen tissue slide, or fixed, frozen clinical tissue section were prepared as mentioned in Example 1. The version 1 gelling solution was prepared as described in Example 1 and was added to the tissue section. The gel chamber was constructed as in Example 1 and FIG. 2. The gel chamber containing the human brain tissue was incubated at 37° C. in a humidified environment for 2 hours.

Figure 3:
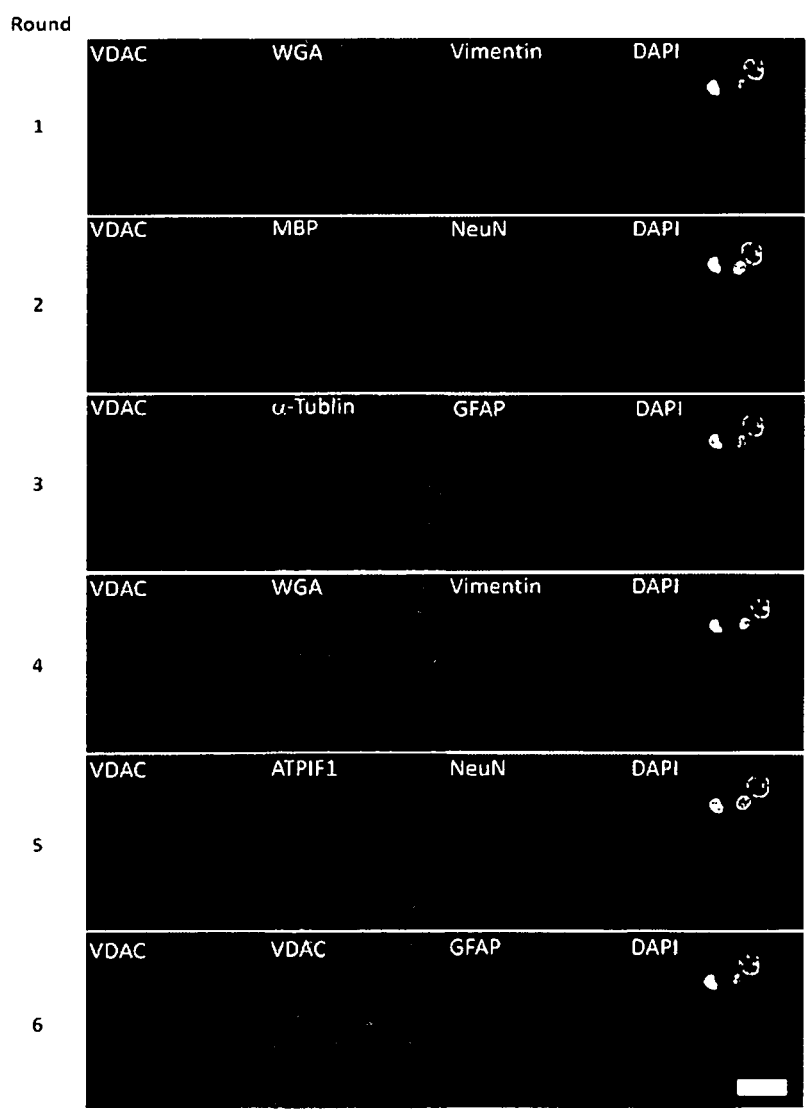
FIG. 3 are photomicrographs (original in color) of serial biomolecule staining of a human brain tissue section post-expansion. Six rounds of staining-imaging-stripping process were applied to a 5 µm human brain tissue section. DAPI Stains DNA, WGA stains glucosamine, and the rest were antibodies against various proteins as indicated in the images. Expansion factor: 3.8. Scale bar: 10 µm (biological).

Following incubation or storage, the coverslip of the gel chamber was removed and the tissue-containing gel was trimmed as in Example 1. The tissue-containing gel was removed from the slide and placed into a tube containing a solution of 10 mM Tris-HCl, 300 mM SDS, and 5 mM EDTA (pH 8) and was incubated for 12 hours at 75° C. The gel was washed three times with MAXwash™ Washing Buffer for 15 minutes each time. The gel was stained with primary and secondary antibodies, as described in Example 1. Following antibody staining and washing, the gel was stained with 300 nM DAPI in PBS buffer for 20 minutes and washed once with 1×PBS for 10 minutes. To expand the gel, the PBS was removed and the samples were washed with an excess volume of ⅕₀ PBS (at 10 times the final gel volume) 3 to 5 times for 10 minutes each time. The gel was immobilized as in Example 1 and the expanded human brain tissue was imaged using a conventional fluorescent, confocal microscope. Following imaging the gel was stripped, where the slide was placed in a tube of 10 mM Tris-HCl, 300 mM SDS, 5 mM EDTA, and 50 mM β-mercaptoethanol (pH 8) and was incubated for 2 hours at 75° C. The gel was washed with MAXwash™ Washing Buffer 3 times for 15 minutes each and stained with the next round of primary and secondary antibodies. The resulting gel was imaged using a conventional fluorescent, confocal microscope as seen in FIG. 3.

Example 3: ExPath of Biological Specimens Using Biomolecule Retention Polymer Human whole blood (liquid) was mixed with the version 1 gelling solution, as prepared in Example 1, in a 1:3 ratio. The sample was vortexed to ensure complete mixing and dropped onto a glass slide. The gel chamber was constructed as described in Example 1 and FIG. 2 and was incubated for 1 hour at 37° C., followed by incubation at 60° C. for 1 hour, both in a humidified environment.

Figure 4:
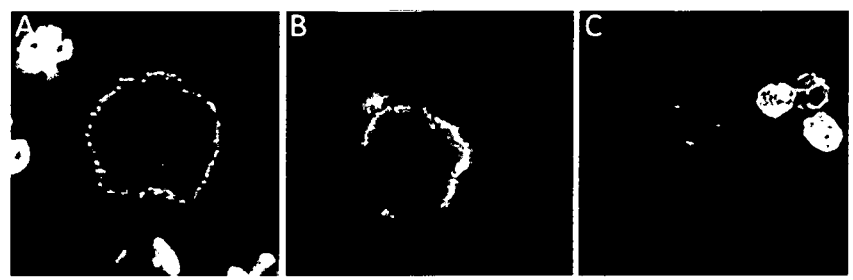
FIG. 4 provides fluorescent imaging of various expanded human whole blood sample with one-pot approach (originals in color, as indicated). (A) Stains: DAPI (blue, stain for DNA); CD4 (green, stain for T cells); Tom20 (red, stain for mitochondria), Wheat germ agglutinin (purple, stain for glucosamine). (B-C) Stains: DAPI (blue, stain for DNA); CD8 (green, stain for T cells); Wheat germ agglutinin (purple, stain for glucosamine). Scale bar: 10 µm.
Figure 5:
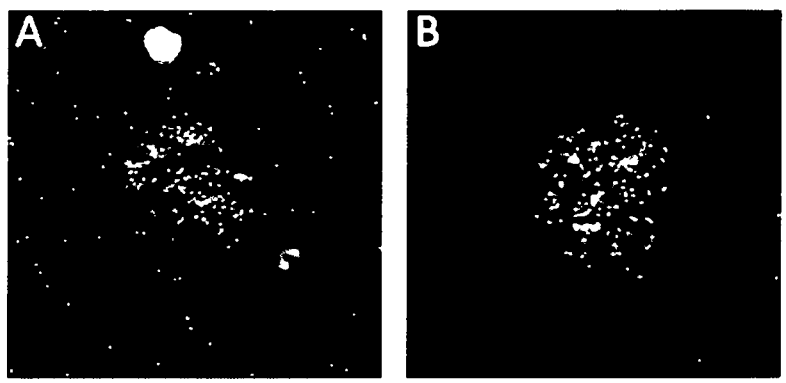
FIG. 5 provides images showing a one-pot approach allows detection of microRNA in the expanded whole blood sample. Stains (original in color, as indicated): DAPI (blue, stain for DNA); miR-21 (green); miR-191-5p (purple). Scale bar: 10 µm.

Following incubation, the coverslip of the gel chamber was removed and the tissue-containing gel was trimmed as in Example 1. The tissue-containing gel was removed from the slide and placed into a tube containing homogenization buffer (10 mM Tris-HCl, 300 mM SDS, 8 M urea, and 5 mM EDTA (pH 8)) and was incubated at 80° C. for 2 hours. For mRNA imaging, the gelled sample/slide was added directly to the digestion buffer with Proteinase K (as prepared in Example 1) and incubated for 30 minutes at 65° C. The gel was washed with MAXwash™ Washing Buffer 3 times for 15 minutes each. The gel was washed once with 1×PBS buffer for 10 minutes, stained with 300 nM DAPI in PBS buffer for 20 minutes, and washed once with 1× RT PBS for 10 minutes. The PBS was removed from the gel and was expanded using the procedure outlined in Example 1. The gel was immobilized as in Example 1 and imaged using a conventional fluorescent, confocal microscope. The resulting images from the immunofluorescence imaging and RNA imaging can be found in FIG. 4 and FIG. 5, respectively.

Example 4: Expansion of Mouse Neuromuscular Junction

A monomer solution 2 was prepared by mixing together stock solutions of 96.2 g/100 mL N,N'-dimethylacrylamide (final concentration 23.8 g/100 mL), 38 g/100 mL sodium acrylamide (final concentration 18.8 g/100 mL), 50 g/100 mL acrylamide (final concentration 1.28 g/100 mL), 2 g/100 mL N,N'-methylene bisacrylamide (final concentration 0.026 g/100 mL), 29.2 g/100 mL sodium chloride (final concentration 10 g/100 mL), and 10×PBS (final concentration 1×) at 4° C. The monomer solution 2 was prepared and stored at −20° C. A version 2 gelling solution was prepared on ice and was composed of 192 μL of previously prepared monomer solution 2 (at 4° C.), 2 μL of aqueous 10% TEMED, 4 μL of aqueous 10% APS, and 2 μL of aqueous 95% methacrolein (final concentration 1%) solution. The APS initiator solution was added last to prevent premature gelation.

The cold, immediately prepared gelling solution (200 μL) was added the mouse neuromuscular junction and it was ensured that the sample was entirely covered. The tissue sample with the gelling solution was incubated for 1 hour at 4° C. The gel chamber was constructed as described in Example 1 and FIG. 2. The gel chamber containing the mouse neuromuscular junction was incubated for 1 hour at 37° C., followed by incubation at 60° C. for 1 hour, both in a humidified environment.

Following incubation, the coverslip was removed, and the tissue-containing gel was trimmed, as described in Example 1. The trimmed sample was placed in a solution containing homogenization buffer, as prepared in Example 3, and was incubated at 80° C. for 48 hours. Following incubation, the gel was washed with 3 times with RT PBS buffer for 15 minutes each.

Samples were labelled by washing the sample multiple times with 1×PBS for 10 minutes each time, followed by incubation of a 1×PBS solution containing primary antibodies overnight at RT. The sample was washed several times with 1×PBS solution and incubated with a 1×PBS solution containing secondary antibodies or other labeling reagent overnight at RT.

Figure 6:
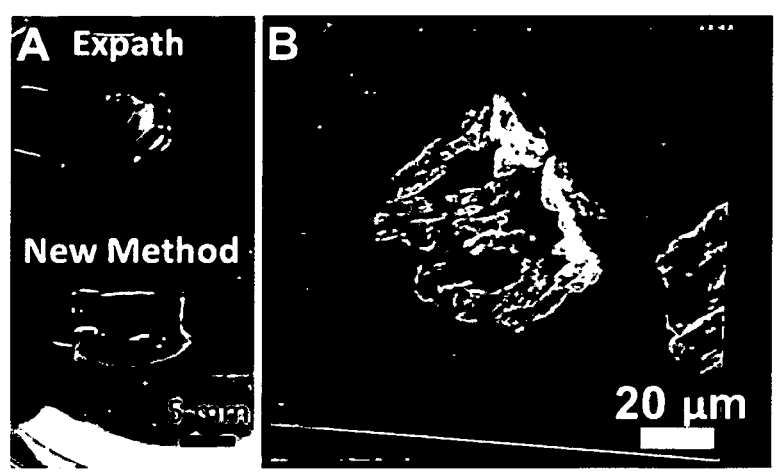
FIG. 6 provides a photograph (A) and photomicrograph (B) showing expansion and imaging of a mouse neuromuscular junction. (A) Photos of mouse neuromuscular junctions treated with Expansion Pathology approach of International Patent Application Publication No. WO 2017/147435) or the method described herein, respectively. The Expansion Pathology approach failed to expand the mouse neuromuscular junction. (B) Three dimension fluorescent imaging of the expanded mouse neuromuscular junction expressing tdTomato in axon. Stains (original in color, as indicated): Blue, DAPI; Green, streptavidin against biotinated α-Bungarotoxin; Red, Anti-red fluorescent protein antibody. Expansion factor: 3.5.

To expand the tissue-containing gel, the samples were washed with 1×PBS buffer for 10 minutes and stained with 300 nM DAPI in PBS buffer for 20 minutes, followed by a 10-minute rinse in 1×PBS. The PBS was removed and was expanded using the procedure outlined in Example 1. The gel was immobilized as in Example 1 and imaged using a conventional fluorescent, confocal microscope and results can be found in FIG. 6.

Example 5: Expansion of 5dpf Zebrafish

The incubation of the 5dpf zebrafish required the preparation of a third gelling solution. A version 3 gelling solution was prepared on ice and was composed of 192 µL of previously prepared monomer solution 2 (at 4° C.), 2 µL of aqueous 10% TEMED, 4 µL of aqueous 10% potassium persulfate (KPS), and 2 µL of aqueous 95% methacrolein (final concentration 1%) solution. The KPS initiator solution was added last to prevent premature gelation. The 5dpf zebrafish was incubated with the version 3 gelling solution for 8 hours at 4° C., followed by incubation with the version 2 gelling solution, as prepared in Example 4, at 4° C. for 1 hour. The gel chamber was constructed as in Example 1 and FIG. 2 and the 5dfp zebrafish was incubated at for 1 hour at 37° C., followed by incubation at 60° C. for 1 hour, both in a humidified environment.

Figure 7:
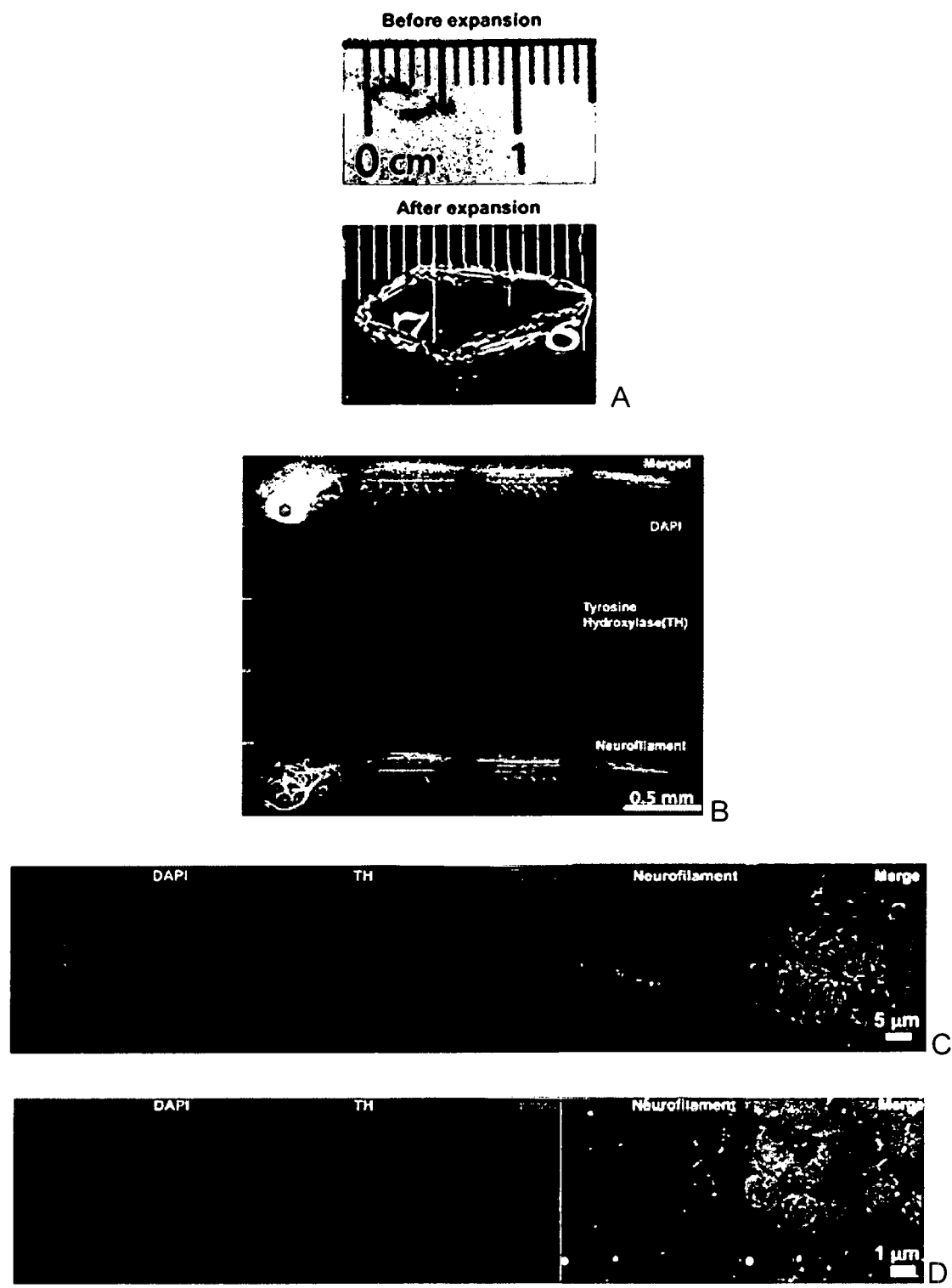
FIG. 7 provides a photograph and photomicrographs showing expansion and imaging of a 5dpf zebrafish. (A) Photographs of zebrafish before and after expansion. (B) Low magnification fluorescent image of the whole zebrafish in the expanded state. (C) Zoom-in images of the expanded fish retina from (B). (D) Further zoom-in images of (C). Originals of (B), (C), and (D) are in color.
Figure 8A:
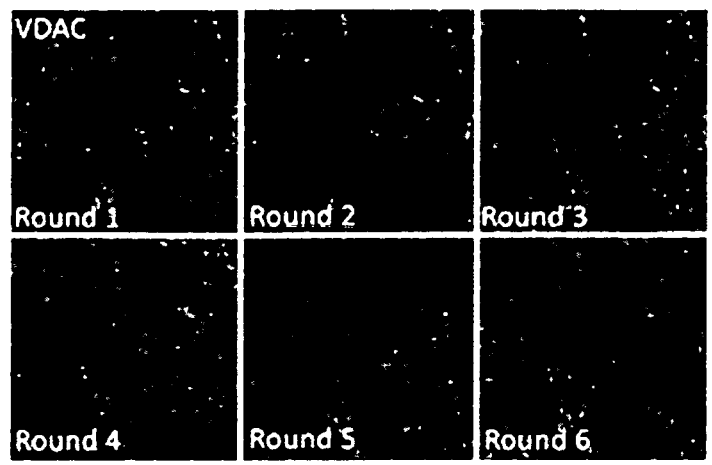
FIGS. 8A-8D provide photomicrographs and graphs relating to serial biomolecule imaging on an expanded human brain tissue section. Six rounds of staining-imaging-washing processes were applied to a 5 μm human brain tissue section purchased from US Biomax, Inc. The acquisition parameters were the same across all six images.
Figure 8B:
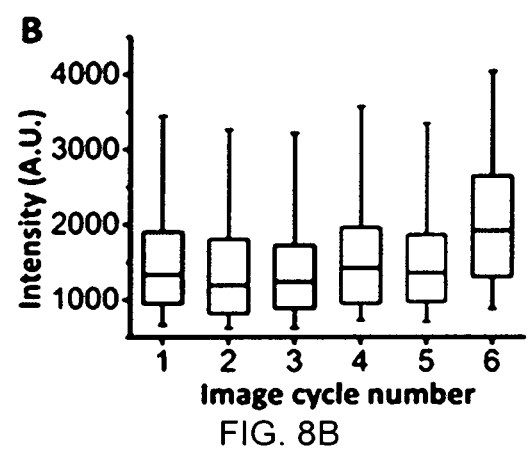
Figure 8C:
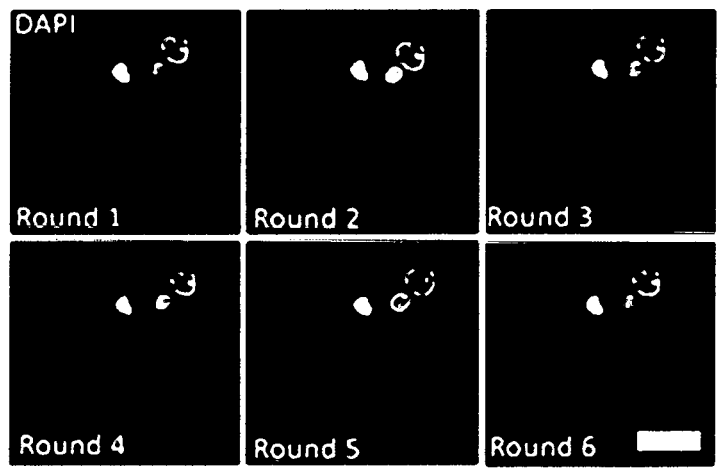
Figure 8D:
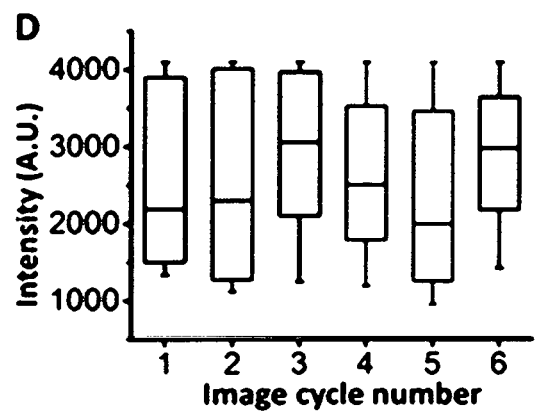

Following incubation, the coverslip was removed and the tissue-containing gel was trimmed, as described in Example 1. The trimmed sample was placed in homogenization buffer, as prepared in Example 3, and was incubated at 80° C. for 48 hours. Following incubation, the gel was washed with RT PBS buffer 3 times for 15 minutes each. The samples were labelled with primary and secondary antibodies following the procedure outlined in Example 4. The tissue sample was expanded using the procedure outlined in Example 1. The expanded tissue sample was analyzed using a conventional fluorescent, confocal microscope and imaging results can be found in FIG. 7.

Example 6: Expansion and Multiplex Imaging of Human Alzheimer's Brain Tissue Section An FFPE brain tissue section was prepared according to the procedure in Example 1. The tissue section was incubated with the version 2 gelling solution for 1 hour at 4° C. The gel chamber was constructed as described in Example 1 and FIG. 2 and was incubated for 1 hour at 37° C., followed by incubation at 60° C. for 1 hour, both in a humidified environment. Following incubation, the coverslip was removed, and the tissue-containing gel was trimmed, as described in Example 1. The trimmed sample was placed in homogenization buffer, as prepared in Example 4, and was incubated at 80° C. for 48 hours. The tissue-containing gel was washed with 3 times RT PBS buffer for 10 minutes each.

Figure 9:
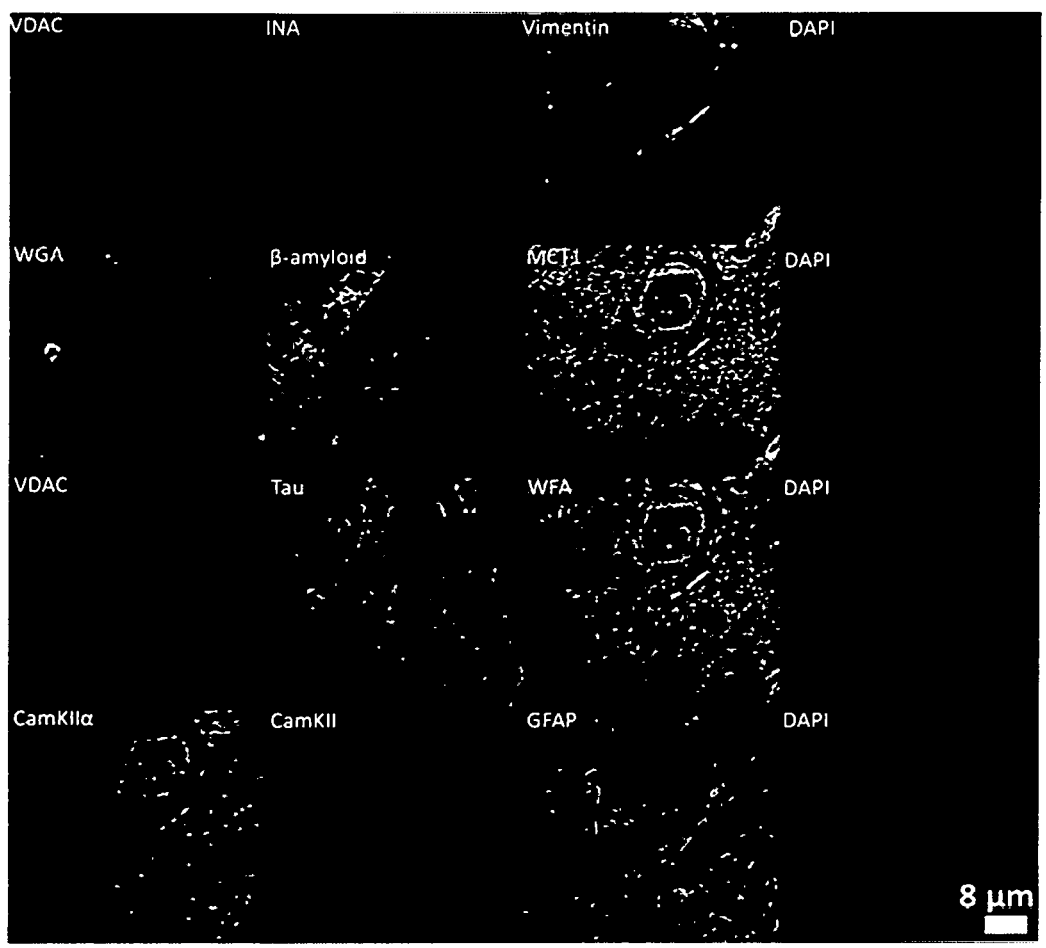
FIG. 9 provides photomicrographs (originals in color) of three rounds of serial imaging with 10 different markers on an expanded human brain hippocampal autopsy. Expansion factor: 4.2; Stains: VDAC: Voltage-dependent anion channel; INA: α-Internexin; MCT1: Monocarboxylic acid transporter 1; CamKII: calmodulin-dependent protein kinase II; GFAP: Glial fibrillary acidic protein.

The samples were labelled with primary and secondary antibodies following the procedure outlined in Example 4. The tissue sample was expanded using the procedure outlined in Example 1. The expanded tissue sample was analyzed using a conventional fluorescent, confocal microscope and results can be found in FIGS. 8A-8D. The labelling, expansion, and imaging process can be repeated when more than 4 markers are being analyzed in the sample specimen. The already imaged tissue-containing gel was labelled for additional antibodies, following the procedure outlined in Example 4. The tissue sample was expanded using the procedure outlined in Example 1 and imaged using a conventional fluorescent, confocal microscope and results can be found in FIG. 9.

Example 7: Expansion of *Candida albicans* Biofilms

Figure 10:
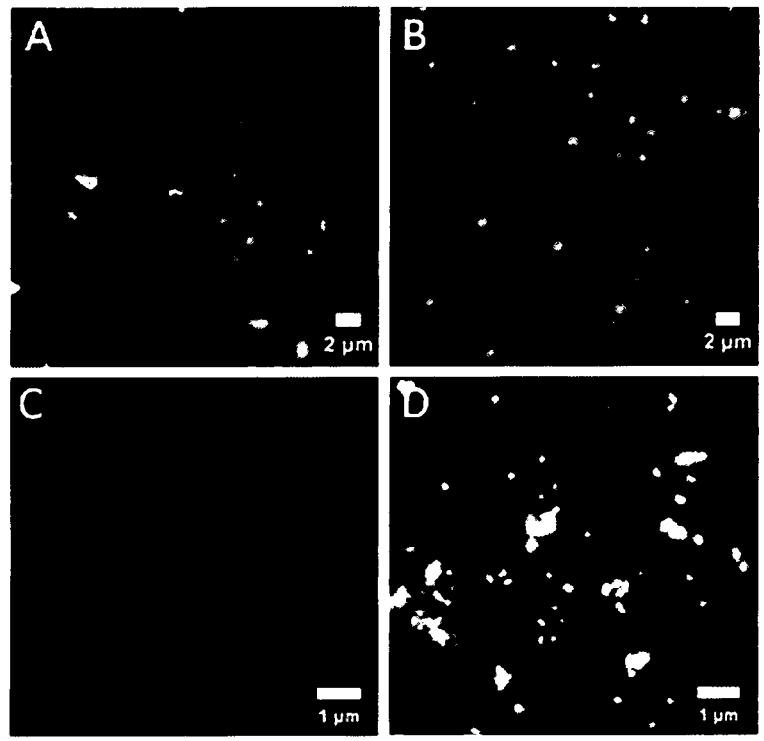
FIG. 10 (A-B) wide-field images of unexpanded *Candida albicans* cells (A) and expanded cells (B) in a biofilm. (C-D) wide-field images of unexpanded *Streptococcus pneumoniae* cells (C) and expanded cells (D) in a biofilm. Post-homogenization stains (originals in color, as indicated): (A-B) Blue: DAPI; Green Wheat Germ Agglutinin, Alexa Fluor 488. (C-D) Blue: DAPI; Green: VP1-FITC; Magenta: Capsule protein.
Figure 11:
FIG. 11 provides a three-dimensional image of *C. albicans* biofilm. Stain (original in color, as indicated): Blue: DAPI; Green: Wheat Germ Agglutinin; Red: Concanavalin A. Expansion factor: 4.
Figure 12:
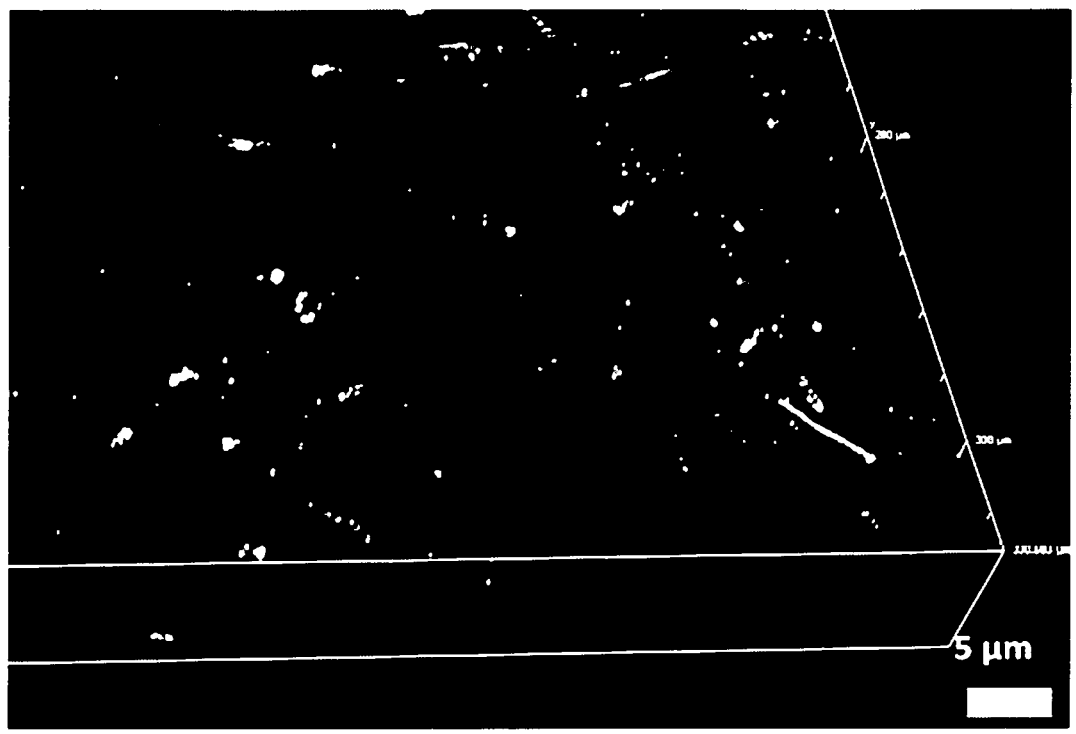
FIG. 12 provides a three-dimensional RNA image of *C. albicans* biofilm. Stain (original in color, as indicated): Blue: DAPI; Green: RBT4 mRNA; Red: ASH1 mRNA; Magenta: ECE1 mRNA. Expansion factor: 4.

A *C. albicans* biofilm was grown, and was incubated with the version 2 gelling solution, as prepared in Example 4, for 1 hour at 4° C. Following incubation, the gel chamber was constructed as described in Example 1 and FIG. 2 and was incubated for 1 hour at 37° C., followed by incubation at 60° C. for 1 hour, both in a humidified environment. The coverslip was removed and the tissue-containing gel was trimmed, as described in Example 1. The trimmed sample was placed in a solution containing ~1 mL of digestion buffer (1 mM EDTA, 10 mM Tris (pH 7.5), 1 kU/mL of lyticase and appropriate amount of fluorescently labelled lectins (such as wheat germ agglutinin or Concanavalin A) or fluorescently labelled oligo probes against RNA/DNA) and incubated at 37° C. for 48 hours. The biofilm-gel sample was washed 3 times with PBS buffer, 15 minutes each time, and stained with 300 nM DAPI in PBS buffer for 20 minutes. The gel was washed once with 1×PBS for 10 minutes. The biofilm sample was expanded using the procedure outlined in Example 1. The expanded tissue sample was analyzed using a conventional fluorescent, confocal microscope and results can be found in FIG. 10, FIG. 11, and FIG. 12.

Example 8: Expansion of *Aspergillus fumigatus* Infected Mouse Lung Tissue

An *A. fumigatus* biofilm was grown on mouse tissue, and was incubated with the version 2 gelling solution, as prepared in Example 4, for 1 hour at 4° C. Following incubation, the gel chamber was constructed as described in Example 1 and FIG. 2 and was incubated for 1 hour at 37° C., followed by incubation at 60° C. for 1 hour, both in a humidified environment. Following incubation, the coverslip was removed, and the tissue-containing gel was trimmed, as described in Example 1. The trimmed sample was placed in homogenization buffer, as prepared in Example 4, and was incubated at 80° C. for 48 hours. Alternatively, the biofilm-tissue gelled sample was incubated in Protinase K buffer (50 mM Tris (pH 8.0). 25 mM EDTA, 0.5% Triton X-100, and 0.8 M NaCl) with 4 U/mL of proteinase K at 65° C. for 1 hour. The sample was washed 3 times with RT PBS buffer, at 15 minutes each.

Figure 13:
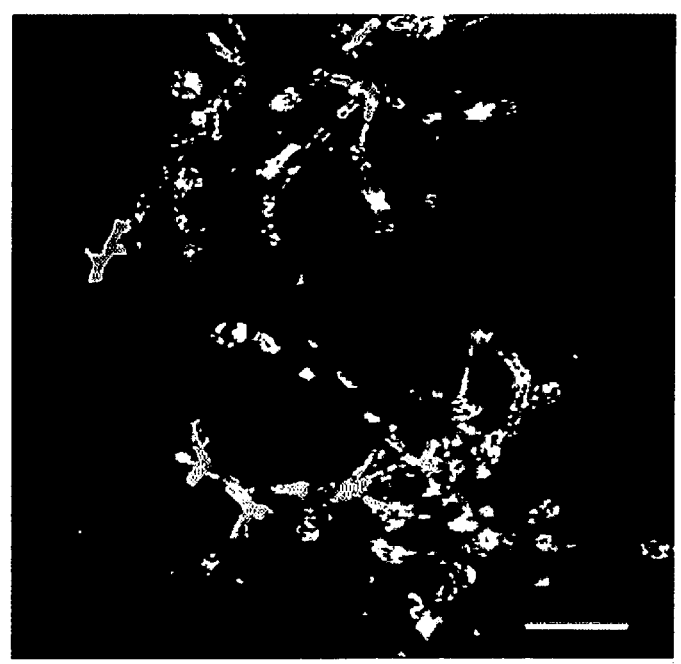
FIG. 13 provides a fluorescent image of *Aspergillus fumigatus*-infected mouse lung tissue in the expanded state. Stain (original in color, as indicated): Blue: tissue autofluorescence; Red: Wheat Germ Agglutinin. Expansion factor: 4.5.

For simultaneous microbial cell and tissue labeling, the sample was rinsed multiple times with 1×PBS solution for 10 minutes each. The sample was incubated with digestion buffer, as prepared in Example 7. The sample was washed several times with 1×PBS and was incubated with a 1×PBS solution containing appropriate fluorescently labelled secondary antibodies or other labeling reagent overnight at RT. The biofilm-tissue gel sample was washed once with PBS buffer for 10 minutes and then stained with 300 nM DAPI in PBS buffer for 20 minutes. The gel was washed once with 1×PBS for 10 minutes. The biofilm-tissue sample was expanded and immobilized using the procedure outlined in Example 1. The expanded tissue sample was analyzed using a conventional fluorescent, confocal microscope and results can be found in FIG. 13.

The following numbered clauses describe various aspects and embodiments of the present invention.

Clause 1: A method of preparing a cell or tissue sample for microscopy, comprising: permeating the sample with a polymer monomer composition comprising an α,β-unsaturated carbonyl monomer, such as an acrylate, methacrylate, acrylamide, or methacrylamide monomer for producing a water-swellable (co)polymer, and an enal able to polymerize with the acrylate, methacrylate, acrylamide, or methacrylamide monomer; and polymerizing the polymer monomer composition with the enal to form a swellable material containing the cell or tissue sample, resulting in covalent linking of the enal to both the swellable material and a biomaterial in the sample.

Clause 2: The method of clause 1, wherein the polymer monomer composition comprises a crosslinker.

Clause 3: The method of clause 1, wherein the crosslinker is N,N'-methylene-bis(acrylamide).

Clause 4: The method of clause 2 or 3, comprising from 0.01 g/100 mL to 5 g/100 mL of the crosslinker.

Clause 5: The method of clause 1, further comprising homogenizing mechanical properties of the cell or tissue sample after formation of the swellable material and before hydrating the sample.

Clause 6: The method of clause 5, wherein the mechanical properties of the cell or tissue sample are homogenized by digesting the sample with a protease.

Clause 7: The method of clause 6, wherein the protease is proteinase K.

Clause 8: The method of clause 5, wherein the mechanical properties of the cell or tissue sample are homogenized by incubating the sample with a detergent and/or a denaturant, such as 10 mM-300 mM SDS, 1M-8M urea, and/or 1-100 mM mercaptoethanol/DTT, and/or 0.5-100 mM EDTA/EGTA.

Clause 9: The method of any one of clauses 1-8, wherein the $\alpha,\beta$-unsaturated carbonyl monomer is acrylic acid, an alkaline metal salt of an acrylate, methacrylic acid, an alkaline metal salt of a methyacrylate, acrylamide, and/or methacrylamide.

Clause 10: The method of clause 9, wherein the $\alpha,\beta$-unsaturated carbonyl monomer is acrylic acid, an alkaline metal salt of an acrylate, methacrylic acid, or an alkaline metal salt of a methyacrylate combined with acrylamide or methacrylamide.

Clause 11: The method of any one of clauses 1-10, wherein the enal is acrolein or methacrolein.

Clause 12: The method of any one of clauses 1-11, wherein the sample is a whole organism or embryo.

Clause 13: The method of any one of clauses 1-11, wherein the sample comprises a plurality of organs of an organism.

Clause 14: The method of any one of clauses 1-11, wherein the cell or tissue sample is a tissue section.

Clause 15: The method of clause 14, wherein the tissue section is provided mounted with a coverslip and/or paraffin-embedded, and the method further comprises pre-processing the tissue section with an organic solvent, such as xylene, to remove the coverslip and/or paraffin from the sample, and replacing the organic solvent with an aqueous solution.

Clause 16: The method of clause 15, wherein the organic solvent is removed with one or more washes with ethanol and/or a mixture of ethanol and water, followed by one or more washes with an aqueous solution, such as, without limitation, water, PBS, or saline.

Clause 17: The method of any one of clauses 1-16, further comprising staining the sample.

Clause 18: The method of clause 17, wherein the stain is a DAPI stain.

Clause 19: The method of any one of clauses 1-18, further comprising, prior to permeating with the polymer monomer composition, labeling a biomolecule of the sample with a detectable ligand, such as an immunofluorescence label or an immunohistochemistry label.

Clause 20: The method of any one of clauses 1-18, further comprising, after polymerizing the polymer monomer composition, or after hydrating the sample, labeling a biomolecule of the sample with a detectable ligand, such as an immunofluorescence label or an immunohistochemistry label.

Clause 21: The method of clause 19 or 20, wherein the detectable ligand is a dye-conjugated or enzyme-conjugated ligand.

Clause 22: The method of clause 19 or 20, wherein the dye of the dye-conjugated ligand is a fluorescent dye.

Clause 23: The method of any one of clauses 19-22, wherein the ligand of the dye-conjugated ligand is an antibody, an antibody fragment, or an antibody mimetic.

Clause 24: The method of any one of clauses 19-22, wherein the ligand of the dye-conjugated ligand is a nucleic acid or a nucleic acid analog.

Clause 25: The method of any one of clauses 1-24, wherein during hydration, the sample swells isotropically, thereby maintaining the relative spatial relationship of biomolecules in the sample.

Clause 26: The method of any one of clauses 1-25, wherein the cell or tissue sample is fixed in a fixative, further comprising removing the fixative from the sample by exposing the sample to a solvent for the fixative prior to permeating the cell or tissue sample with the polymer monomer composition.

Clause 27: The method of any one of clauses 1-26, comprising permeating the cell or tissue sample with a polymer monomer composition comprising sodium acrylate, acrylamide, N,N'-methylene bis(acrylamide), and acrolein or methacrolein;

polymerizing the polymer monomer composition within the sample to form a swellable material, resulting in covalent linking of the acrolein or methacrolein to both the swellable material and biomaterials in the sample; and hydrating the sample to cause the swellable material to physically expand.

Clause 28: The method of any one of clauses 1-19, wherein the polymer monomer composition comprises from 0.5M to 6M of $\alpha,\beta$-unsaturated carbonyl monomer and/or from 0.01 g/100 mL to 10 g/100 mL of the enal.

Clause 29: The method of any one of clauses 1-28, wherein the sample comprises an organism having a cell wall (such as bacteria, fungus, or plant cells or tissue), further comprising, after polymerizing the polymer monomer composition and before hydrating the sample, enzymatically-digesting the cell wall of the organism.

Clause 30: The method of clause 29, wherein the cell wall of the organism is digested with a glucanase or cellulase, such as lyticase, chitinase, or lysozyme.

Clause 31: A method of producing a high-resolution microscopic image of a cell or tissue sample comprising preparing a cell or tissue sample according to the method of any one of clauses 1-30, and viewing and/or imaging the cell or tissue sample.

Clause 32: A kit comprising a vessel containing a $\alpha,\beta$-unsaturated carbonyl monomer as described in any of the preceding clauses; an enal as described in any of the preceding clauses in the same vessel as the $\alpha,\beta$-unsaturated carbonyl monomer, or in a separate vessel; and a mold of chamber for receiving a biological specimen and polymerizing the $\alpha,\beta$-unsaturated carbonyl monomer and the enal.

Clause 33: The kit of clause 32 24, further comprising in a vessel, an enzyme for digesting a cell wall of a cell or organism, such as a glucanase or cellulase, such as lyticase, chitinase, or lysozyme.

The present invention has been described with reference to certain exemplary embodiments, dispersible compositions and uses thereof. However, it will be recognized by those of ordinary skill in the art that various substitutions, modifications or combinations of any of the exemplary embodiments may be made without departing from the spirit and scope of the invention. Thus, the invention is not limited by the description of the exemplary embodiments, but rather by the appended claims as originally filed.

What is claimed is:

1. A method of preparing a cell or tissue sample for microscopy, comprising:
    permeating the cell or tissue sample with a gelling solution comprising an acrylate monomer, a methacrylate monomer, an acrylamide monomer, and/or a methacrylamide monomer for producing a water-swellable (co)polymer and an enal, wherein the enal is able to polymerize with the acrylate monomer, the methacrylate monomer, the acrylamide monomer, and/or the methacrylamide monomer; and
    polymerizing the acrylate monomer, the methacrylate monomer, the acrylamide monomer, and/or the methacrylamide monomer of gelling solution with the enal of the gelling solution to form a swellable material containing the cell or tissue sample, wherein the enal of the swellable material covalently links the swellable material to a biomaterial in the sample,
    wherein the covalent link between the enal of the swellable material and the biomolecule in the cell or tissue sample is reversible.

2. The method of claim 1, wherein the gelling solution further comprises a crosslinker,
    wherein the crosslinker comprises N,N'-methylene-bis(acrylamide).

3. The method of claim 2, comprising from 0.01 g/100 mL to 5 g/100 mL of the crosslinker.

4. The method of claim 1, further comprising homogenizing the cell or tissue sample after formation of the swellable material to facilitate even expansion of the sample; and hydrating the cell or tissue sample to cause the swellable material to physically expand.

5. The method of claim 4, wherein the cell or tissue sample are homogenized by digesting the sample with a protease or by incubating the sample with a detergent and/or a denaturant,
    wherein the detergent and/or the denaturant comprises 10 mM-300 mM SDS, 1M-8M urea, 1-100 mM mercaptoethanol/DTT, and/or 0.5-100 mM EDTA/EGTA.

6. The method of claim 4, further comprising, prior to permeating the cell or tissue sample with the gelling solution, after polymerizing the acrylate monomer, the methacrylate monomer, the acrylamide monomer, and/or the methacrylamide monomer of gelling solution with the enal of the gelling solution, or after hydrating the cell or tissue sample, labeling a biomolecule of the cell or tissue sample with a detectable ligand, wherein the detectable ligand comprises an immunofluorescence label, an immunohistochemistry label, or a dye-conjugated or enzyme-conjugated ligand that optionally comprises a fluorescent dye.

7. The method of claim 6, wherein the detectable ligand is an antibody, an antibody fragment, an antibody mimetic, a nucleic acid, or a nucleic acid analog.

8. The method of claim 4, wherein during hydration, the cell or tissue sample swells isotropically, thereby maintaining the relative spatial relationship of biomolecules in the cell or tissue sample.

9. The method of claim 4, wherein the cell or tissue sample comprises a cell wall, and the method further comprises, after formation of the swellable material and before hydrating the cell or tissue sample, enzymatically-digesting the cell wall with a glucanase or a cellulase,
    wherein the glucanase or the cellulase comprises lyticase, chitinase, or lysozyme.

10. The method of claim 1, wherein the monomers of the gelling solution are acrylic acid, an alkaline metal salt of an acrylate, methacrylic acid, an alkaline metal salt of a methyacrylate, acrylamide, and/or methacrylamide.

11. The method of claim 1, wherein the enal is acrolein or methacrolein.

12. The method of claim 1, wherein the sample is a section prepared from a whole organism or embryo.

13. The method of claim 1, wherein the sample is a section prepared from a plurality of organs of an organism or a tissue section.

14. The method of claim 13, wherein the sample comprises a tissue section and wherein the tissue section is provided mounted with a coverslip and/or paraffin-embedded, and the method further comprises pre-processing the tissue section with an organic solvent to remove the coverslip and/or paraffin from the sample, and replacing the organic solvent with an aqueous solution.

15. The method of claim 14, wherein the organic solvent comprises xylene.

16. The method of claim 1, further comprising staining the cell or tissue sample, wherein the stain is a DAPI stain.

17. The method of claim 1, wherein the cell or tissue sample is fixed in a fixative, and the method further comprising removing the fixative from the cell or tissue sample by exposing the cell or tissue sample to a solvent for the fixative prior to permeating the cell or tissue sample with the gelling solution.

18. The method of claim 1, comprising:
    permeating the cell or tissue sample with a gelling solution comprising sodium acrylate, acrylamide, N,N'-methylene bis(acrylamide) and either acrolein or methacrolein;
    polymerizing the sodium acrylate, acrylamide, and N,N'-methylene bis(acrylamide) of the gelling solution with the acrolein or the methacrolein of the gelling solution to form the swellable material containing the cell or tissue sample, wherein the acrolein or the methacrolein of the swellable material covalently links the swellable material to a biomaterial in the cell or tissue sample; and
    hydrating the cell or tissue sample to cause the swellable material to physically expand.

19. The method of claim 1, wherein the gelling solution comprises from 0.5M to 6M of acrylate monomer, methacrylate monomer, acrylamide monomer, and/or methacrylamide monomer and from 0.01 g/100 mL to 10 g/100 mL of the enal.

20. The method of claim 1, wherein the enal comprises the following structure:

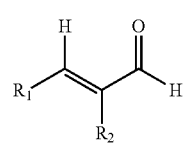

wherein $R_1$ and $R_2$ are independently H, $C_1$-$C_3$ alkyl, $C_1$-$C_3$ haloalkyl, $C_1$-$C_3$ alkyl-aryl, or $C_1$-$C_3$ halo alkyl-aryl.

21. A method of producing a high-resolution microscopic image of a cell or tissue sample comprising preparing a cell or tissue sample according to the method of claim 1, and viewing and/or imaging the cell or tissue sample.

\* \* \* \* \*